US005115141A

United States Patent [19]

Gold

[11] Patent Number: 5,115,141

[45] Date of Patent: May 19, 1992

[54] REGISTER MARK DETECTION APPARATUS UTILIZING A FIRST AND SECOND LINEAR ARRAY OF SENSORS ARRANGED NON-PARALLEL ALLOWING LONGITUDINAL AND TRANSVERSE MONITORING

[75] Inventor: Daniel Gold, Bushey, England

[73] Assignee: Crosfield Press Controls Limited, England

[21] Appl. No.: 527,809

[22] Filed: May 24, 1990

[30] Foreign Application Priority Data

Jun. 15, 1989 [GB] United Kingdom ................. 8913770

[51] Int. Cl.[5] ............................................ G01N 21/86

[52] U.S. Cl. ..................................... 250/548; 250/557

[58] Field of Search ........................ 250/548, 557, 226; 356/401, 407

[56] References Cited

U.S. PATENT DOCUMENTS 2,962,596 11/1960 Leimer et al. ....................... 250/548

3,323,700 6/1967 Epstein et al. ...................... 250/548

FOREIGN PATENT DOCUMENTS 0289206 11/1988 European Pat. Off. .

1087484 10/1967 United Kingdom .

*Primary Examiner*—David C. Nelms

*Assistant Examiner*—T Davenport

*Attorney, Agent, or Firm*—Sughrue, Mion, Zinn, Macpeak & Seas

[57] ABSTRACT

Apparatus for detecting register marks includes one or more linear arrays of sensors (19, 20) arranged transverse to the direction of relative movement of a web (3) and the apparatus. Where there is more than one linear array (19, 20), they are arranged so that they are substantially non-parallel to allow both longitudinal and transverse monitoring of register marks on the web (3). A signal is generated on detection of a mark and processing means determine the sensor (19) or group of sensors which detected a mark and whether the marks are in register with those of other webs (3).

16 Claims, 4 Drawing Sheets

REGISTER MARK DETECTION APPARATUS UTILIZING A FIRST AND SECOND LINEAR ARRAY OF SENSORS ARRANGED NON-PARALLEL ALLOWING LONGITUDINAL AND TRANSVERSE MONITORING

FIELD OF THE INVENTION

The invention relates to apparatus for detecting register marks.

DESCRIPTION OF THE PRIOR ART

In the field of colour printing, a colour picture is printed on a web in a series of separate printing operations in each of which a respective colour separation is printed on the web. Typically, these colour separations are printed in cyan, magenta, yellow (and optionally black) inks. It is important that the separate colour separations are printed in register so that there is no misalignment between the different separations. Misalignment can occur for a variety of reasons due mainly to the fact that the web has to travel from one print station to another between printing operations with the attendant risk of stretching or contraction occuring during the passage or indeed slippage and the like. To deal with this, it has been the practice for many years to monitor the registration of printed colour separations and, if necessary, adjust the printing process and in particular the manner in which the web is fed in order to compensate for any misregister.

To achieve register control, it has been the practice to print simultaneously with each colour separation one or more register marks alongside the separation and then to detect the relative positions of register marks corresponding to different colour separations. Ideally, the register marks from different colour separations will remain in a fixed relationship to each other (typically in alignment) but if there is any misregister then this ideal situation will change and can be detected and compensated for.

There are two major types of mis-register. Firstly, longitudinal mis-register in which the position of one separation relative to another in the direction of movement of the web is offset from its ideal position and secondly sidelay in which the lateral position of one separation is offset from another. One method of detecting both types of mis-registration has been to use specially shaped register marks which taper in a direction transverse to the direction of web movement. By detecting the arrival and departure of a register mark, its length in the direction of movement of the web can be determined and due to the taper this provides an indication of the lateral position of the mark while, providing one edge of the mark is orthogonal to the direction of movement, this can be used for monitoring longitudinal registration.

One of the problems with these tapered marks is their large size and indeed until recently all register marks had a relatively large size and used a large quantity of ink. It is desirable to be able to reduce the size of marks quite considerably and attempts have been made to do this in the field of offset colour printing. In the field of offset printing, it has been proposed to lay down dot shaped register marks with small dimensions (for example 1-2 mm diameter). In the offset printing process, in which the print stations are close together, the relative positions of all register marks are compared at the end of a print run using a photographic technique or the like. In the field of gravure printing, however, it has not so far been possible to make use of small dot shaped register marks. This is because in the gravure process there needs to be a web path of reasonable length between successive print stations in order to allow the inks to dry and this contributes significantly towards any mis-register. Consequently, register marks need to be detected downstream of individual print stations. This is particularly difficult in the case of small dot shaped register marks since with conventional detection heads which typically include a photodetector and a light source, it is quite possible for the head to be misaligned to such an extent that it fails to detect the dot register mark at all. To deal with this, it has been the practice to provide a manually movable or motorised head which is moved by an operator into approximate alignment with the register mark path prior to printing.

SUMMARY OF THE INVENTION

In accordance with one aspect of the present invention, register mark detection apparatus for detecting register marks on a web during relative movement between said web and said apparatus comprises detection means including a first linear array of sensors extending transverse to said direction of relative movement, each said sensor generating a signal when a mark is detected; and processing means for monitoring said signals from said sensors so as to determine which sensor or group of sensors has sensed the passage of a mark.

We have devised a new type of register mark detection apparatus in which the detection means includes a linear array of sensors. This has the significant advantage that when attempting to locate register marks during the initial setting-up procedure, the detection means itself does not have to be moved but can remain fixed providing it extends across fully the area which may contain the register marks. This enables the setting-up procedure to be fully automated and avoids the need for any motorised or manual movement of the detection means.

In one example, the processing means includes an analogue switch and selection means for selecting groups of the sensors in a preselected manner, the output signals from each group of sensors being fed to and combined by the analogue switch which generates a composite output signal indicative of whether or not a mark has been detected. By monitoring the outputs from groups of sensors, the speed with which register marks are detected is increased.

The above example is particularly suited for use with sensors having a small, circular field of view. In other examples, the sensors are elongate with the elongate dimension also extending transverse to the direction of relative movement.

In one form of the apparatus, the register mark detection apparatus may be provided in addition to a conventional registration system which is aligned in response to the detection of register marks by the register mark detection apparatus. Preferably, however, the detection means of the register mark detection apparatus is also used to achieve register monitoring and possibly register control.

In the event that the detection means is used for additional purposes, where the initial detection of register marks has been achieved by making use of the sensor group technique, the processing means is preferably adapted, subsequent to the detection of register marks, to determine which group of sensors is centered over the register mark path, signals from that group of sensors being used subsequently for register monitoring.

For example, the processing means can be adapted to monitor longitudinal registration between register marks corresponding to different colour separations. This might be achieved, for example, by monitoring the times of arrival of each register mark at the array.

This feature of the invention can be used in addition in register mark monitoring apparatus in accordance with a second aspect of the present invention for monitoring the longitudinal registration of marks on a web during relative movement between the web and the apparatus, the apparatus comprising detection means including a first linear array of sensors extending transverse to the direction of relative movement, each sensor generating a signal when a mark is detected; and processing means for monitoring the signals from the sensors so as to monitor the relative positions of the marks on the web and to determine whether or not the marks are in register.

By using a transverse array of sensors, longitudinal registration can be monitored independently of any lateral offset.

Preferably, however, the detection means further comprises a second linear array of sensors extending transverse to the direction of relative movement and substantially non-parallel with the first array, each sensor of the first array generating a signal when a mark is detected, the signal being fed to the processing means.

The provision of two such non-parallel arrays, both transverse to the direction of relative movement enables not only longitudinal registration of the marks to be monitored but also sidelay or lateral registration. For example, the distance traversed by a mark between the two arrays is directly indicative of its lateral position since the arrays are non-parallel. This fact can be used by the processing means to monitor sidelay where, for example, in an ideal situation the distance traversed is the same for marks corresponding to different colour separations.

Preferably, the two linear arrays are symmetrically angled about a line orthogonal to the direction of relative movement between the web and the apparatus but this is not essential.

The invention is primarily of use in gravure printing where, as explained above, the detection of marks is necessary between successive print stations but it is also applicable in other forms of printing such as offset and indeed could be used for detecting or monitoring register marks at the end of a print operation rather than during a print operation.

BRIEF DESCRIPTION OF THE DRAWINGS

Two examples of register mark monitoring apparatus according to the invention will now be described with reference to the accompanying drawings, in which.

EMBODIMENT

Figure 1:
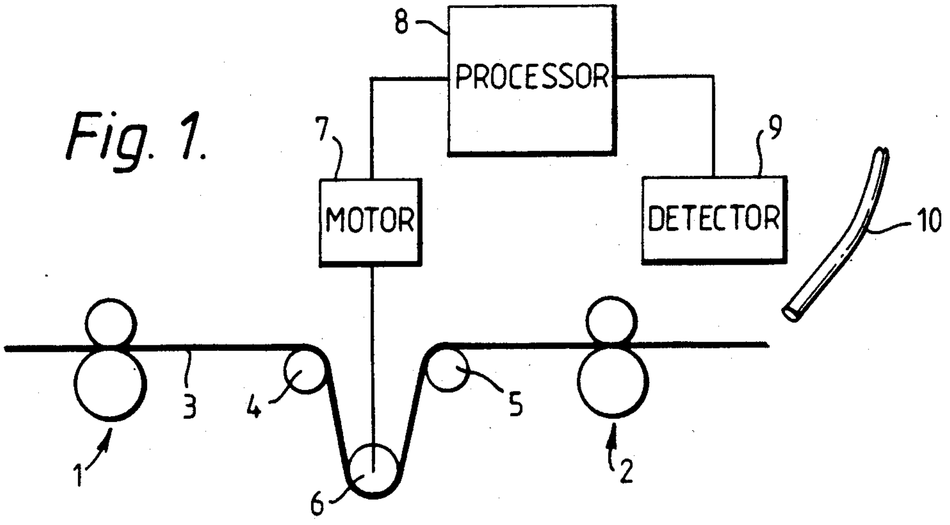
FIG. 1 illustrates part of a gravure printing system incorporating an example of the apparatus according to the invention.

The gravure printing system which is partly shown in FIG. 1 has a conventional form and comprises a yellow separation print station 1 (shown schematically) and a downstream red (or cyan) print station 2 (also shown schematically). A web 3 is fed initially to the yellow print station 1, then around fixed rollers 4, 5 and a movable roller 6 to the red print station 2 and from there to subsequent blue and black print stations (not shown). The roller 6 is movable under the control of a servomotor 7 so as to adjust the length of the web path between the print stations 1, 2 in order to compensate for any mis-register, the motor 7 being controlled by a processor 8. The processor 8 responds to register mark detection signals from a detector head 9 which will be described in more detail below. The region of the web 3 beneath the detector head 9 is illuminated from a remote light source (not shown), light being guided to the web by an optical fibre 10.

Figure 2A:
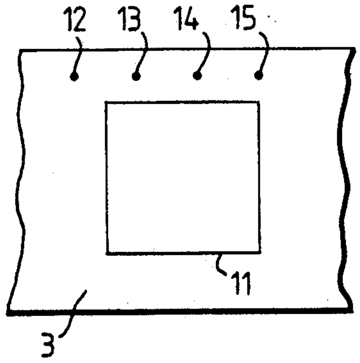
FIGS. 2A and 2B illustrate a web after printing at the yellow and red print stations respectively.
Figure 2B:
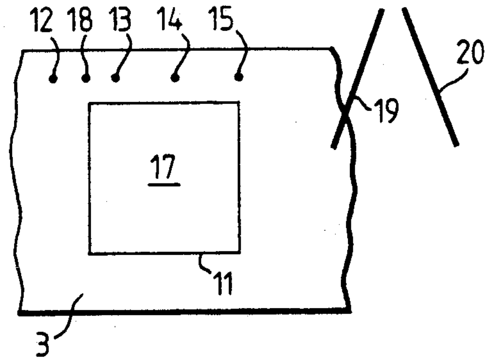

At the yellow print station a yellow separation 11 is printed in a conventional manner onto the web 3 and alongside the separation 11 are printed four dots 12-15 which constitute yellow separation register marks. The dots 12-15 are separated by equal amounts (FIG. 2A). At the red print station 1 a red separation 17 is printed over the yellow separation 11 and at the same time a single red register mark 18 is printed between the marks 12, 13 (FIG. 2B). If register is correct the mark 18 should be positioned exactly between and in alignment with the marks 12, 13. The marks typically have a rectangular form with dimensions 1 mm×2 mm, the longer dimension being orthogonal to the direction of web movement. The web 3 then passes beneath the detector head 9 which has two linear arrays of photosensors 19, 20 angled to each other and at about 45° to a line orthogonal to the direction of moment of the web 3.

Figure 3:
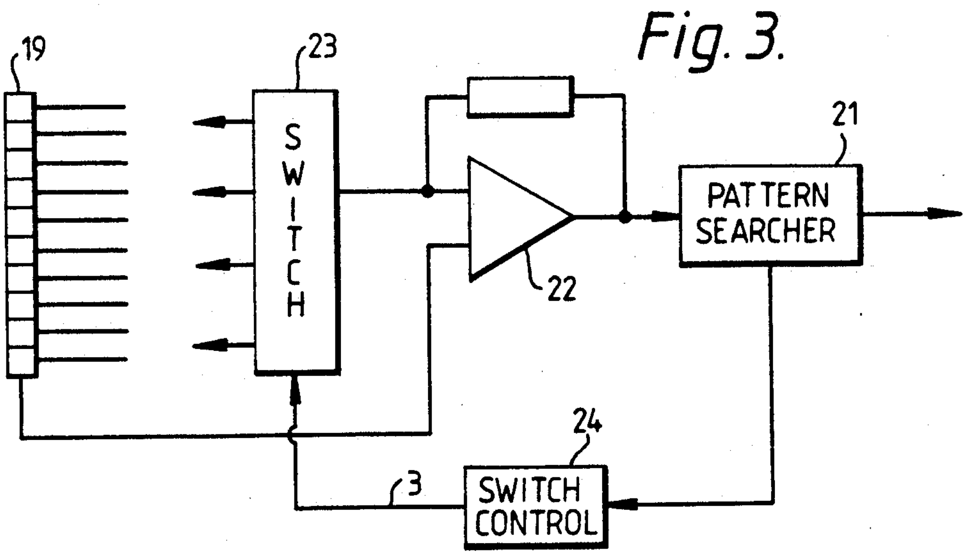
FIG. 3 is a block diagram of the detector and part of the processor of FIG. 1 in more detail.

Initially, the processor needs to determine the general location of the register marks which are being printed and thus in an initial operation the processor 8 makes use of a pattern searcher circuit 21 shown in FIG. 3. The pattern searcher 21 forms part of front end circuitry connected to one of the linear arrays 19 which, in this example, comprises ten photocells. Similar front end circuitry is connected to the other array 20. The commonline of the photosensor array 19 is connected directly to an operational amplifier 22 while the other connection to each photosensor can be selectively connected to an analogue switch 23. The analogue switch 23 has four connections which can be controlled by a switch control circuit 24 to be connected to any sequence of four adjacent photocells. Each photocell 19 generates an output current related to the sensed light intensity (and which will vary significantly when a mark passes underneath that photocell) while the analogue switch 23 combines the output currents from the selected four sensors and feeds the combined current to the other input of the operational amplifier 22 which effectively converts the current signal to a voltage signal which is fed to the pattern searcher 21.

Initially, each pattern searcher 21 (under the control of the processor 8) causes the respective switch control 24 to connect the corresponding analogue switch 23 with the first four photocells in the arrays 19, 20. Each searcher 21 then looks for the passage of four yellow register marks 12–15 at 20 mm spacing. This is achieved by monitoring output signals from the first photocells selected only in short windows overlapping the expected position of each yellow mark. The search starts without a window and looks for a section of print whose long dimension is equal to that of a yellow mark. If found, short windows are set up at the expected position of three further yellow marks. If the sequence is not obtained, the search is aborted and reverts to the initial search without a window. The search may last for two cylinder revolutions for each photocell. In this way, extraneous marks are ignored. If no marks are detected, the pattern searcher 21 causes the switch control 24 to connect the next four photocells to the analogue switch 23. In other words, if photocells numbered 1–4 are initially selected, the next set of four photocells will be those numbered 2–5 and so on. At some point, the pattern searcher 21 will detect a signal from the amplifier 22 indicating that marks are being sensed by the currently active group of four photocells and if these have the required spacing, this indicates that these marks are indeed the register marks 12–15. Each pattern searcher 21 then selects that group of four photocells which are centered over the yellow register marks. This is achieved by monitoring the distance between the signals from the two linear arrays due to a yellow mark and selecting the two groups of sensors which have a mean separation equal to the distance between the signals.

At this point, the system is ready to monitor registration between the yellow and red colour separations.

Figure 4:
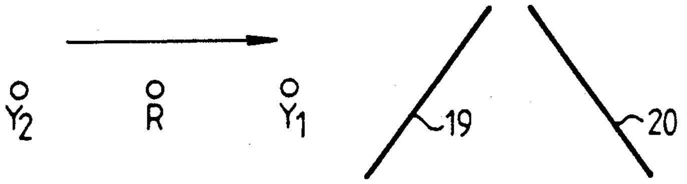
FIG. 4A illustrates schematically three register marks in register following the red print station as they approach the detector.
FIG. 4B illustrates output signals from the upstream linear array upon arrival of the register mark shown in FIG. 4A.
FIG. 4C illustrates output signals from the downstream linear array upon the arrival of the register mark shown in FIG. 4A.
Figure 4:
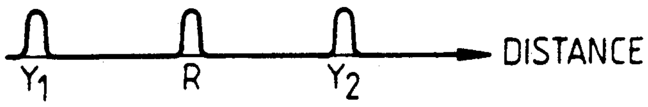
Figure 4:
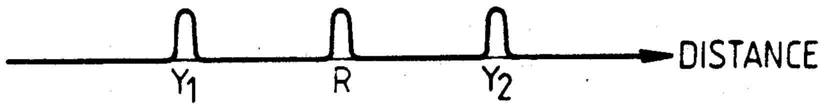

In FIG. 4, the situation is illustrated in which there is exact registration between the two separations. In this case, three register marks are shown, two yellow marks $Y_1$ and $Y_2$ corresponding to marks 13 and 12 respectively in FIGS. 2A and 2B and a single red register mark labelled R corresponding to the mark 18 in FIG. 2B. As can be seen, the red mark R is positioned equidistant between the yellow marks $Y_1$ $Y_2$ and is in alignment with those marks. The marks are upstream of the two linear arrays 19, 20.

FIG. 4B illustrates the form of the output signals from the linear array 19 as the three register marks pass underneath. The signals are shown at their times of occurrence relative to the distance travelled by the web which can be obtained by monitoring web movement directly or indirectly via a cylinder carrying the web. As the first mark $Y_1$ passes under the array 19, it will cause the output signal from the selected group of four sensors in the array to change, thus indicating a mark, and this change is communicated to the processor 8 in the form of a pulse as shown in FIG. 4B. In this, ideal example, the spacing between the marks is substantially the same as the spacing between the groups of sensors of the two arrays 19, 20 under which the marks pass. Consequently, the signals generated by the array 20 are substantially coincident with the signals from the array 19. Thus, when the mark $Y_1$ passes under the array 20, the array 19 generates a pulse corresponding to the mark R. Since there is no difference between the signal R from the array 19 and the signal $Y_1$ from the array 20 this indicates that the marks are in register.

Figure 5:
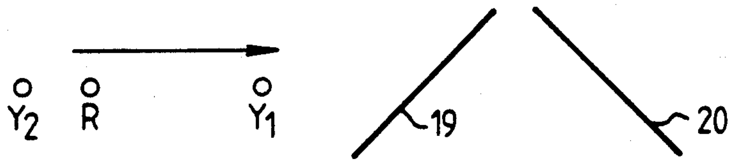
FIGS. 5A-5C are similar to FIGS. 4A-4C but where there is a longitudinal mis-register between the red and yellow register marks.
Figure 5:
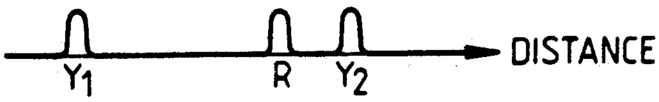
Figure 5:

FIG. 5A illustrates the same group of three marks in which the red mark R is longitudinally offset from its correct position. In this case, as shown in FIG. 5B, there will be a greater distance recorded by the array 19 between the mark $Y_1$ and the mark R and a lesser distance between the mark R and the mark $Y_2$ over the ideal situation shown in FIG. 4. A similar delay will be detected by the array 20 (FIG. 5C). Thus, it can be seen by comparing FIGS. 5B and 5C that the signals R (FIG. 5B) and $Y_1$ (FIG. 5C) do not coincide with the signal $Y_1$ of FIG. 5C leading the signal R of FIG. 5B. Similarly, the signals $Y_2$ (FIG. 5B) and R (FIG. 5C) are offset but in the opposite sense (i.e. the signal from array 19 precedes the signal from the array 20).

These offsets can be used to determine the degree of longitudinal mis-register by using the formula:

$$OFFSET = \tfrac{1}{2}\left[(R(19) - Y_1(20)) + (R(20) - Y_2(19)\right] \quad (1)$$

where the quantities in formula represent web travel distances corresponding to each of the marks specified.

Figure 6:
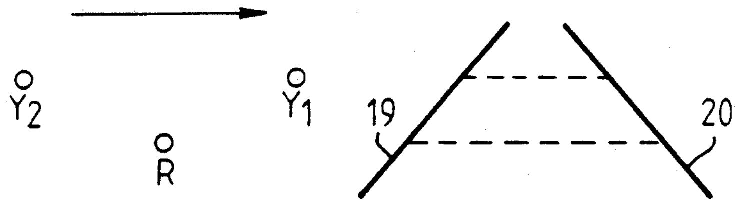
FIGS. 6A-6C are similar to FIGS. 4A-4C but where there is a sidelay mis-register between the red and yellow register marks.
Figure 6:
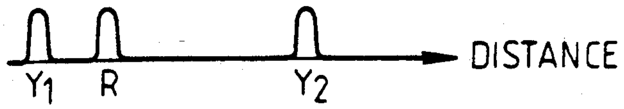
Figure 6:
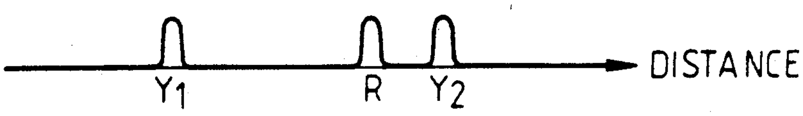

FIG. 6A illustrates a situation in which there is sidelay or lateral offset between the two sets of marks although there is no longitudinal mis-register. It can be seen clearly from FIG. 6A that the lateral position of each set of marks can be determined very easily from the distance travelled by each mark between the two arrays 19, 20. This distance can then be related directly to the degree of sidelay.

FIG. 6B illustrates the pulse signals generated by the array 19 and it will be seen that since the red mark R is laterally offset from the yellow mark $Y_1$, it will be sensed by the array 19 earlier than would otherwise be the case. In contrast, the red mark R will be sensed later than normal by the array 20. The degree of sidelay can then be calculated using the following equation:

$$SIDELAY\ ERROR = \left[(Y_1(20) - Y_1(19)) - (R(20) - R(19))\right]K \quad (2)$$

where the quantities shown in the formula constitute web travel distances and K is a constant.

Typically, the distances will be represented by counts generated by a clock timed to the web movement, for example generating one pulse for every 0.01 mm of movement.

Figure 7:
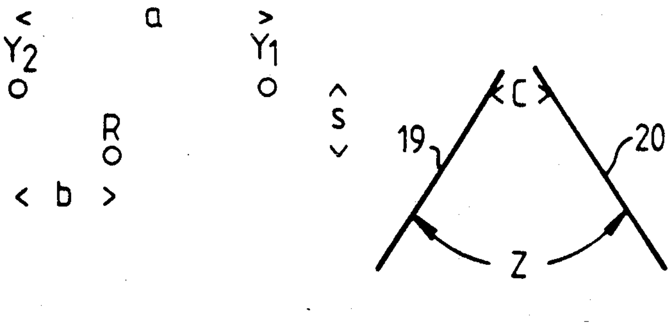
FIGS. 7A-7C are similar to FIGS. 4A-4C but where there is both longitudinal and sidelay mis-register; and, FIG. 8 illustrates schematically another example of the detector head.
Figure 7:
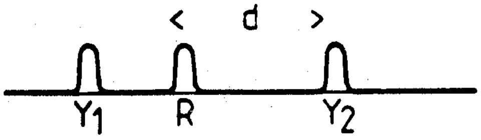
Figure 7:
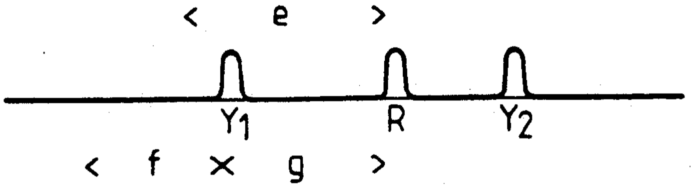

In the above example, for simplicity, the correct distance between yellow and red marks was chosen to be equal to the mean distance between the two groups of elements. This is not essential and FIG. 7 illustrates a more general situation from which it can be shown that the longitudinal mis-register a/2-b can be derived independently of the sidelay offset s. For the purposes of the following analysis, FIG. 7 illustrates various distances a-g and the angle between the two arrays 19, 20 is indicated as Z. Typically this angle will be 90°. The distance "c" between the arrays is the distance travelled by each yellow mark between the arrays.

From FIG. 7 it is apparent that:

$$f = c \quad (3)$$

$$e=c+2sTan(Z/2) \quad (4)$$

From equations 3 and 4, the sidelay distance s is $$s=(e-f)/2Tan(Z/2) \quad (5)$$

In addition, from FIG. 7 it can be seen that:

$$d=b+sTan(Z/2) \quad (6)$$

$$g=a-b+sTan(Z/2) \quad (7)$$

From equations 6 and 7 it can be shown that the longitudinal error defined as:

$$(a-2b)/2 \quad (8)$$

is given by the equation:

$$(a-2b)/2=(g-d)/2 \quad (9)$$

Figure 8:
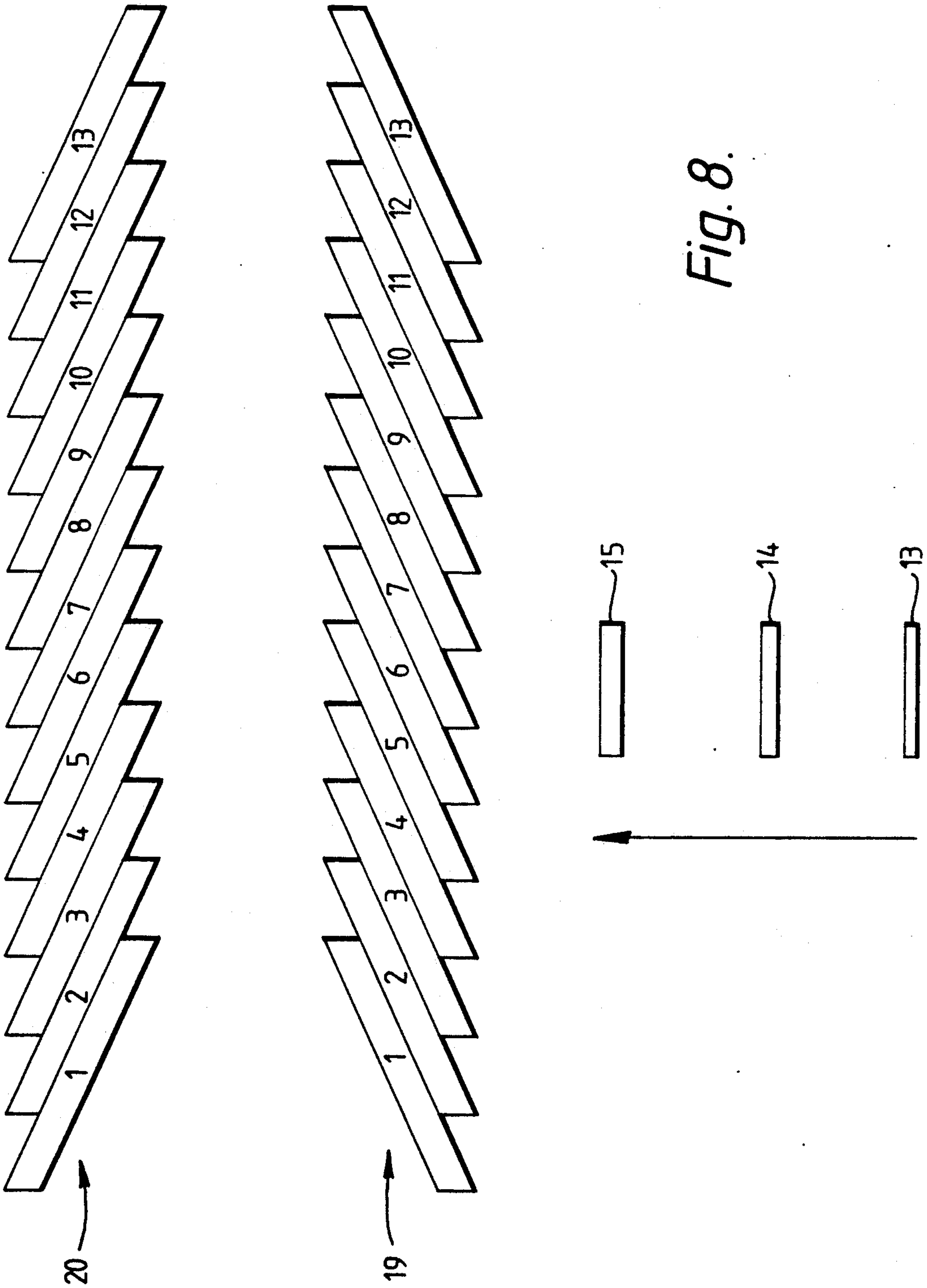

FIG. 8 illustrates a modified example in which the two arrays of sensors 19, 20 are formed by elongate sensing elements having an elongate dimension equivalent to that of a group of four photosensors of the type previously described. The elongate sensors in each array are arranged parallel with each other but each sensor of one array is at substantially 45° to the direction of web movement and is arranged symmetrically with the corresponding sensor in the other array. The operation of the system using these arrays is similar to that previously described but this example has the advantage that the selection of groups of elements is considerably simplified since in this case each element will be individually selected. Furthermore, the waveforms of the signals generated during the passage of register marks will be substantially the same for each sensor unlike in the previous example.

I claim:

1. Register mark detection apparatus for detecting register marks on a web during relative movement between said web and said apparatus, said apparatus comprising:

detection means including a first linear array of sensors extending transverse to said direction of relative movement, each said sensor of said first array generating a signal when a mark is detected, and a second linear array of sensors (20) extending transverse to said direction of relative movement and substantially non-parallel with said first array, each said sensor of said second array generating a signal when a mark is detected; and processing means for monitoring said signals from said sensors so as to determine which sensor or group of sensors has sensed the passage of a mark.

2. Apparatus according to claim 1, wherein said two linear arrays are symmetrically angled about a line orthogonal to said direction of relative movement between said web and said apparatus.

3. Apparatus according to claim 1, wherein said sensors are elongate with said elongate dimension also extending transverse to said direction of relative movement.

4. Apparatus according to claim 1, wherein said processing means includes an analogue switch and selection means for selecting groups of said sensors in a preselected manner, the output signals from each group of sensors being fed to and combined by said analogue switch which generates a composite output signal indicative of whether or not a mark has been detected.

5. Apparatus according to claim 4, wherein said processing means is adapted, subsequent to said detection of register marks, to determine which group of sensors is centered over the register mark path.

6. Apparatus according to claim 1, wherein said sensors have a small, circular field of view.

7. Apparatus according to claim 1, wherein said register mark detection apparatus is provided in addition to a conventional registration system which is aligned in response to said detection of register marks by the register mark detection apparatus.

8. Apparatus according to claim 1, wherein said detection means of said register mark detection apparatus is provided with register monitoring and control means.

9. Register mark monitoring apparatus for monitoring the longitudinal registration of marks on a web during relative movement between said web and said apparatus, said apparatus comprising:

detection means including a first linear array of sensors extending transverse to the direction of relative movement, each said sensor of said first array generating a signal when a mark is detected, and a second linear array of sensors (20) extending transverse to said direction of relative movement and substantially non-parallel with said first array, each said sensor of said second array generating a signal when a mark is detected; and processing means for monitoring said signals from said sensors so as to monitor the relative positions of said marks on said web and to determine whether or not marks are in register.

10. Apparatus according to claim 9 wherein said two linear arrays are symmetrically angled about a line orthogonal to said direction of relative movement between said web and said apparatus.

11. Apparatus according to claim 9 wherein said sensors are elongate with said elongate dimension also extending transverse to said direction of relative movement.

12. Apparatus according to claim 9 wherein said processing means includes an analogue switch and selection means for selecting groups of said sensors in a preselected manner, the output signals from each group of sensors being fed to and combined by said analogue switch which generates a composite output signal indicative of whether or not a mark has been detected.

13. Apparatus according to claim 12 wherein said processing means is adapted, subsequent to said detection of register marks, to determine which group of sensors is centered over the register mark path.

14. Apparatus according to claim 9 wherein said sensors have a small, circular field of view.

15. Apparatus according to claim 9, wherein said register mark detection apparatus is provided in addition to a conventional registration system which is aligned in response to said detection of register marks by the register mark detection apparatus.

16. Apparatus according to claim 9, wherein said detection means of said register mark detection apparatus is provided with register monitoring and control means.

* * * * *